(12) United States Patent
Sivadasan et al.

(10) Patent No.: US 6,522,050 B2
(45) Date of Patent: Feb. 18, 2003

(54) HEAD SUSPENSION ASSEMBLY WITH PIEZOELECTRIC BEAM MICRON ACTUATOR

(75) Inventors: Kodikkunnathukulangara Sivadasan, Temecula, CA (US); Guoxiao Guo, Singapore (SG)

(73) Assignee: Data Storage Institute, Singapore (SG)

( * ) Notice: Subject to any disclaimer, the term of this patent is extended or adjusted under 35 U.S.C. 154(b) by 0 days.

(21) Appl. No.: 09/898,596

(22) Filed: Jul. 3, 2001

(65) Prior Publication Data

US 2002/0008436 A1 Jan. 24, 2002

(30) Foreign Application Priority Data

Jul. 24, 2000 (SG) .......................... 200004124

(51) Int. Cl.$^7$ .............................................. H01L 41/08
(52) U.S. Cl. ........................................ 310/328; 360/106
(58) Field of Search ................................. 310/328, 330, 310/331; 360/106, 104

(56) References Cited

U.S. PATENT DOCUMENTS

| | | | | |
|---|---|---|---|---|
| 2,208,940 A | * | 7/1940 | Dunning ...................... | 310/328 |
| 2,735,025 A | * | 5/1956 | Wiggins ...................... | 310/328 |
| 4,435,666 A | * | 3/1984 | Fukui et al. ................. | 310/328 |
| 4,886,382 A | * | 12/1989 | Oota et al. .............. | 310/328 X |
| 5,216,559 A | | 6/1993 | Springer | |
| 5,410,207 A | * | 4/1995 | Miura et al. ................. | 310/328 |
| 5,657,188 A | | 8/1997 | Jurgenson et al. | |
| 5,712,524 A | * | 1/1998 | Suga ........................... | 310/328 |
| 5,796,558 A | | 8/1998 | Hanrahan et al. | |
| 5,867,347 A | | 2/1999 | Knight et al. | |
| 5,898,544 A | | 4/1999 | Krinke et al. | |
| 5,914,835 A | | 6/1999 | Girard et al. | |
| 6,002,549 A | | 12/1999 | Berman et al. | |
| 6,027,260 A | * | 2/2000 | Oda et al. ............... | 310/328 X |
| 6,157,115 A | * | 12/2000 | Hassler, Jr. .................. | 310/328 |
| 6,278,223 B1 | * | 8/2001 | Sasaki et al. ................ | 310/328 |
| 6,362,542 B1 | * | 3/2002 | Novotny ................... | 310/328 X |

FOREIGN PATENT DOCUMENTS

| | | |
|---|---|---|
| WO | WO 98/20486 | 5/1998 |
| WO | WO 98/25264 | 6/1998 |
| WO | WO 98/27546 | 6/1998 |

\* cited by examiner

*Primary Examiner*—Mark O. Budd
(74) *Attorney, Agent, or Firm*—Renner, Otto, Boisselle & Sklar, LLP

(57) ABSTRACT

A micro actuator driven load beam mechanism for use in a head suspension assembly is disclosed. The mechanism includes a load beam including a proximal end portion and a distal end portion, a hinge portion connecting the proximal and distal end portions of the load beam for permitting relative movement therebetween, and a piezoelectric beam connecting the proximal and distal end portions, the piezoelectric beam being selectively energizable to effect relative movement between the proximal and distal end portions. The load beam includes a pocket for holding at least one end of the piezoelectric beam. The piezoelectric beam and the pocket may be inclined relative to a hinge plane to control the load beam twist and minimize the altitude variations of the beam tip.

14 Claims, 4 Drawing Sheets

HEAD SUSPENSION ASSEMBLY WITH PIEZOELECTRIC BEAM MICRON ACTUATOR

FIELD OF THE INVENTION

The invention herein described relates generally to micro actuators and to head suspension assemblies of disk storage systems which utilize piezoelectric micro actuators as secondary actuators. Although the invention is principally described in relation to a magnetic disk storage device, those skilled in the art will appreciate that the principles of the invention may be used in other devices where micro actuators may be useful to effect controlled minute movements.

BACKGROUND OF THE INVENTION

Magnetic disk storage devices (disk drives) include magnetic head suspension assemblies for the purpose of positioning and supporting a read/write transducer head relative to the surface of a rotating magnetic storage disk. A common construction of a head suspension assembly includes a load beam which has a mounting base portion at its proximal end, a relatively rigid portion at its distal end, and a spring portion between the mounting base portion and the rigid portion. The mounting base portion is mounted to a primary actuator which moves the head suspension assembly to position the read/write head over desired information tracks on the disk. A flexure is provided at the distal end of the load beam, which includes a slider mounted thereon for supporting the read/write head. The slider has an aerodynamic design so that it "flies" via a lift force on an air bearing generated by the spinning disk. The flexure permits pitch and roll movements of the slider so that the head can follow disk surface fluctuations. The spring portion provides a spring force which counteracts the lift force of the slider in a known manner.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the primary actuator to quickly and accurately position the read/write head over the desired track. For this reason, some manufacturers have incorporated secondary actuators which are supported by the load beam of the head suspension assembly. These suspension-based micro actuators are used to effect minute movement of the distal end portion of the load beam, and therefore the read/write head, relative to the proximal end portion of the load beam and independently of operation of the primary actuator.

Piezoelectric elements heretofore have been used as the micro actuators. The piezoelectric driven micro actuator is a simple and economically viable option for high track density (i.e., the number of concentric tracks per inch, or "TPI") servoing. Some suspension-based micro actuators have employed two piezoelectric elements, or beams, working in the breathing mode (also known as the piezoelectric transverse effect 31 mode). In the prior art load beam suspension 1 shown in FIG. 1, two piezoelectric beams 2 sit piggyback on top of the load beam 3 on either side of a centrally located hinge portion 4. The beams 2 work in a push-pull manner and the hinge portion 4 transforms a substantially linear 31 mode action into a rotation which is amplified by the leverage of the load beam (the length of the portion of the load beam that is rotated upon actuation of the piezoelectric beams), causing the tip 5 of the load beam to deflect a few microns in the cross-track direction.

Applicant has appreciated that of all the actuating modes of a piezoelectric element, the breathing mode has the advantage of providing a large displacement in the 31 sense, which is proportional to the longitudinal vibration in the lengthwise direction of the element. In order to conserve mass and maximize the stroke length, it is desirable to use a relatively long, narrow and thin piezoelectric beam. A formidable challenge to using such a piezoelectric structure in a suspension load beam is the structural interface between the piezoelectric beams and the load beam. The piezoelectric beams typically have a minimum thickness of 0.2 mm (typical value) for providing sufficient structural strength whereas the load beams typically have a relatively smaller thickness (typically 0.1 mm). Because of their extremely thin structure, it is difficult to form a reliable bond between the thickness sides, or edges, of the load beam and the piezoelectric beam, although such an interface is the ideal approach to optimizing the aforedescribed breathing mode.

Some manufacturers glue the flat side of the piezoelectric beams on top of the load beam surface as shown in FIG. 1. However, while working in the breathing mode, the piezoelectric beams also expand and contract in the thickness direction, or 33 sense of movement (also known as the piezoelectric longitudinal effect 33 mode). Because the load beam is glued to the piezoelectric beams, this 33 movement causes out-of-plane movements of the load beam. In the aforedescribed two beam design, this also causes the load beam to twist (roll). Such a phenomenon affects the altitude (i.e., fly height) and attitude (i.e., roll angle) stability of the slider. In turn, this undesirably affects the PES transfer function and OTC of the system.

An inherent problem with the push-pull actuator arrangement of FIG. 1 is that performance depends upon the characteristics of the individual actuator elements. A high degree of linearity and symmetry are desirable in their performance. The same considerations also apply to the passive components that go into the mechanical load circuits of the individual actuators. In the case of dual piezoelectric beam actuators, it is desirable to have identical piezoelectric beams, adhesive attachments and electric driving circuits working in their linear ranges. However, such identity is difficult to realize from a practical standpoint. For example, the physical dimensions, d33-constant and elasticity of the two piezoelectric beams vary depending on their manufacturing conditions. Environmental, temperature and aging characteristics of the piezoelectric beams could be entirely different. Similarly it is difficult to attain identical area and thickness of the glue layers of the two piezoelectric beams. These factors can cause unsymmetrical twist of the load beam during its operation. Test results on a few samples of a dual piezoelectric beam micro actuator have shown large variations in stroke symmetry, resonance frequencies and damping.

SUMMARY OF THE INVENTION

The present invention provides a micro actuator driven load beam mechanism for use in a head suspension assembly that overcomes one or more drawbacks of prior art load beam mechanisms. According to one aspect of the invention, a load beam mechanism comprises a load beam including a proximal end portion, a distal end portion and a hinge portion connecting the proximal and distal end portions of the load beam for permitting relative movement therebetween in a hinge plane; and a piezoelectric beam connected between the proximal and distal end portions, the piezoelectric beam being selectively energizable to effect relative movement between the proximal and distal end portions. In accordance with the invention, the load beam includes a pocket for retaining at least one end of the piezoelectric beam.

In an embodiment, the piezoelectric beam is retained by the pocket in a plane inclined relative to the hinge plane.

In an embodiment, the pocket is formed by longitudinally opposed catches having oppositely facing attachment surfaces to which opposite face surfaces of the piezoelectric beam are attached, respectively.

In an embodiment, the longitudinally opposed catches extend in opposite directions from the hinge plane.

In an embodiment, the opposed catches hold the piezoelectric beam at an incline relative to the hinge plane.

In an embodiment, the piezoelectric beam is shrunk fitted between the catches.

In an embodiment, the catches have slots for retaining respective ends of the piezoelectric beam.

In an embodiment, the catches are inline with the hinge plane.

In an embodiment, there is only one piezoelectric beam.

According to another aspect of the invention, a micro actuator driven load beam mechanism for use in a head suspension assembly, comprises a load beam including a proximal end portion, a distal end portion and a hinge portion connecting the proximal and distal end portions of the load beam for permitting relative movement therebetween in a hinge plane; and a piezoelectric beam connecting the proximal and distal end portions, the piezoelectric beam being selectively energizable to effect relative movement between the proximal and distal end portions. In accordance with the invention, the piezoelectric beam is disposed in a plane that is inclined relative to the hinge plane.

In an embodiment, the proximal and distal end portions have oppositely facing attachment surfaces to which opposite face surfaces of the piezoelectric beam are attached.

In an embodiment, the attachment surfaces are offset in opposite directions from the hinge plane.

In an embodiment, the face surfaces of the piezoelectric beam are bonded as by gluing to the attachment surfaces.

According to a further aspect of the invention, a micro actuator driven load beam mechanism for use in a head suspension assembly, comprises a load beam having a longitudinal center axis, and including a proximal end portion, a distal end portion and a hinge portion connecting the proximal and distal end portions for permitting relative movement therebetween, the hinge portion being disposed in offset relation to the center axis of the load beam; and a piezoelectric beam connecting the proximal and distal end portions and being transversely centered with respect to the center axis of the load beam, the piezoelectric beam being selectively energizable to effect relative movement between the proximal and distal end portions.

In an embodiment, the hinge portion includes a pair of edge portions and a relatively narrower portion therebetween, the edge portions being connected to the respective proximal and distal end portions.

In an embodiment, there is only a single piezoelectric beam.

The foregoing and other features of the invention are hereinafter fully described and particularly pointed out in the claims, the following description and the annexed drawings setting forth in detail illustrative embodiments of the invention. These embodiments, however, are but a few of the various ways in which the principles of the invention may be employed.

DETAILED DESCRIPTION OF THE INVENTION

Figure 1:
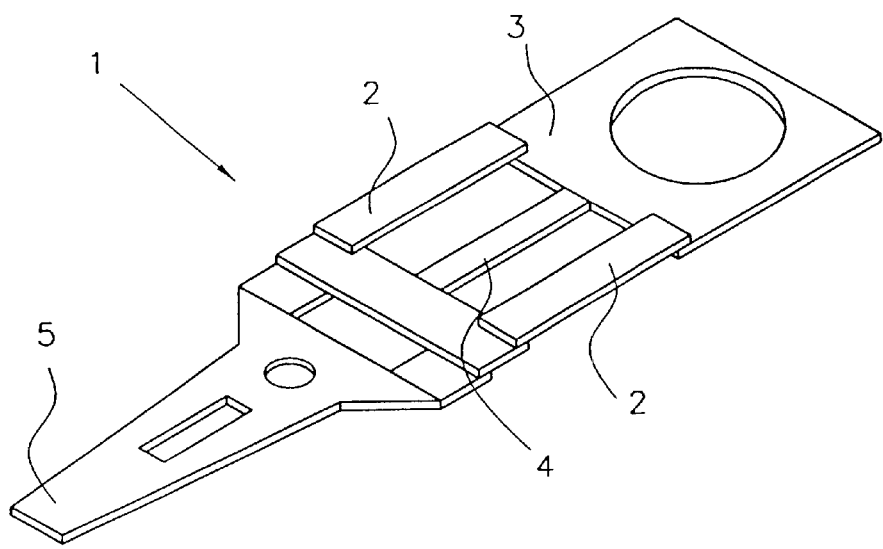
FIG. 1 is a perspective view of a prior art load beam suspension including a pair of piezoelectric actuators or beams.
Figure 2:
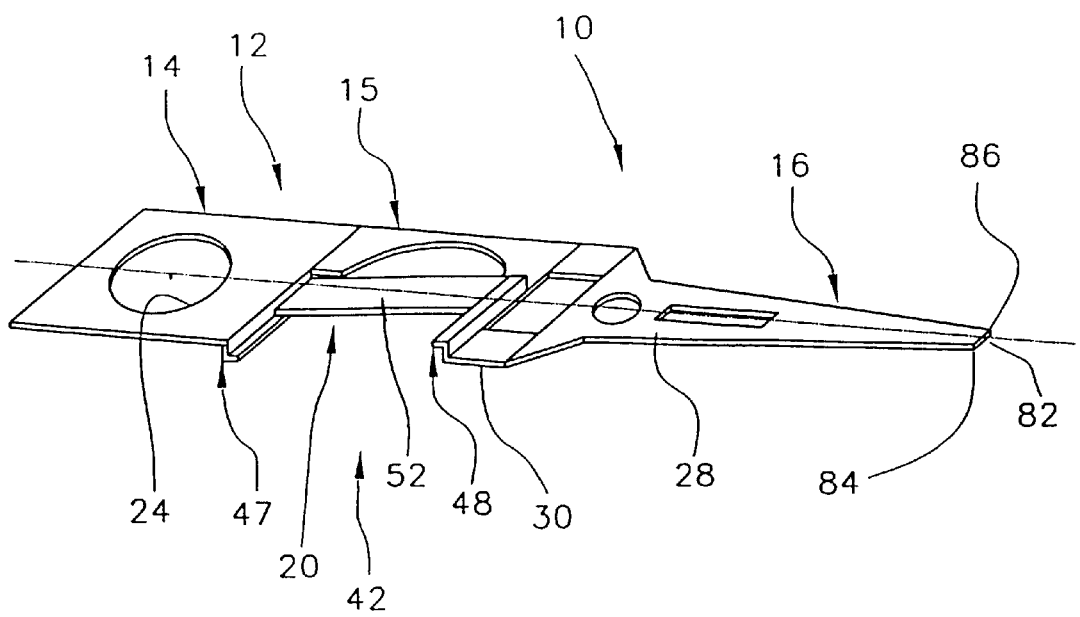
FIG. 2 is a perspective view of a load beam suspension including a piezoelectric micro actuator in accordance with the present invention.
Figure 3:
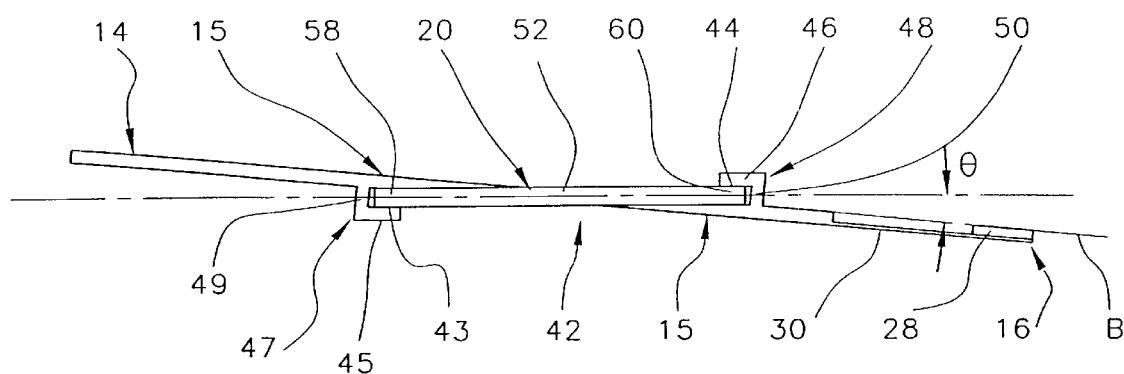
FIG. 3 is a side sectional view of the FIG. 2 load beam suspension.

Referring now to the drawings, FIGS. 2 and 3 show a load beam suspension mechanism, designated generally by reference numeral 10, for use in a head suspension assembly of a magnetic disk drive (not shown). The load beam suspension mechanism 10 includes a load beam 12 having a proximal or base end portion 14, a hinge portion 15 and a distal end portion 16, and a micro actuator 20 which, as described in greater detail below, controls movement of the distal end portion 16 relative to the proximal end portion 14. The proximal end portion 14 of the load beam 12 has a circular opening 24 to facilitate attachment thereof to a primary actuator arm in the disk drive, the movement of the latter being effected, for example, by a voice coil. The distal end portion 16 of the load beam 12 has a tip end region 28 and an actuator end region interconnected by a reduced thickness spring region 30 which is relatively flexible in relation to the relatively stiff tip and actuator end regions. The rigid tip end region 28 supports at the distal end thereof, a flexure, and the slider and read/write head (not shown) of the disk drive. In known manner, the flexure may be integrated into the design of the load beam 12 or formed as a separate element fixed to the distal end portion 16 of the load beam 12.

The proximal end portion 14 and the distal end portion 16 of the load beam 12 are longitudinally spaced apart and form therebetween a pocket 42. The pocket 42 is closed at one side of the load beam by the hinge portion 15 and is open at its opposite side to the side edge of the load beam. As shown, the outer edge of the hinge portion can be continuous with the corresponding edge of the load beam, while the inner edge of the hinge portion may be arcuate whereby the width of the hinge portion is narrowest at a point coincident with the transverse center line of the pocket. As best seen in FIG. 3, opposite ends of the pocket have attachment surfaces 43 and 44 which are parallel but offset in opposite directions relative to the plane of the load beam 12. Such surfaces 43 and 44 may be provided on one leg 45, 46 of L-shape retaining devices or catches 47 and 48 that are parallel and extend transversely with respect to the longitudinal center axis of the load beam. The other legs 49 and 50 of the catches 47 and 48 may formed integrally with or attached to the adjacent proximal and distal end portions 14 and 16, respectively, such legs 49 and 50 extending at right angles to the longitudinal center axis of the load beam 12 and parallel to one another.

The pocket 42 has retained therein the micro actuator 20 which preferably is a planar, rectangular, single layer piezoelectric beam 52 with the piezoelectric material thereof polarized and charged in the out-of-plane direction. In the illustrated embodiment, the piezoelectric beam is transversely centered with respect to the longitudinal center axis of the load beam 12, in which case the hinge portion 15 is necessarily offset to one side of the load beam's longitudinal center axis.

The ends 58 and 60 of the piezoelectric beam 52 are retained by the catches 47 and 48. More particularly, the ends of the piezoelectric beam 52 are adhered at the bottom and top face surfaces thereof to the oppositely offset attachment surfaces 43 and 44, respectively. As a result, the planar extent (or plane) of the piezoelectric beam will be inclined at an angle θ relative to the plane of the load beam for an advantageous reason discussed below.

In use, operation of the piezoelectric beam in either the 31 mode or the 15 mode will effect rotation of the distal end portion 16 about an axis perpendicular to the plane of the load beam, i.e., within a "hinge plane" denoted by reference letter B. During such operation, the piezoelectric beam will also expand and contract in 33 sense and this will cause some out-of-plane movements of the distal end portion 16. Applicant has discovered that such out-of-plane movements can be controlled and/or minimized by reason of the piezoelectric beam being tilted relative to the hinge plane. Such tilt permits relative movement between the proximal end portion 14 and distal end portion 16 in such a way as to minimize out of plane forces (generated by the piezoelectric beam 52) acting on the load beam 12.

Figure 4:
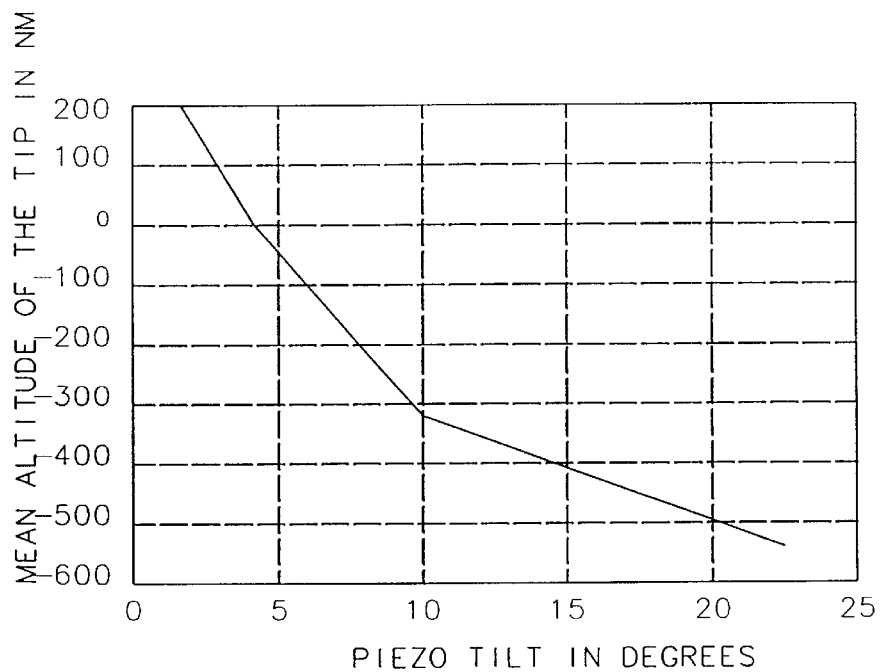
FIG. 4 is a graph showing mean altitude of the tip in nanometers on the y-axis and piezobeam tilt in degrees on the x-axis.
Figure 5:
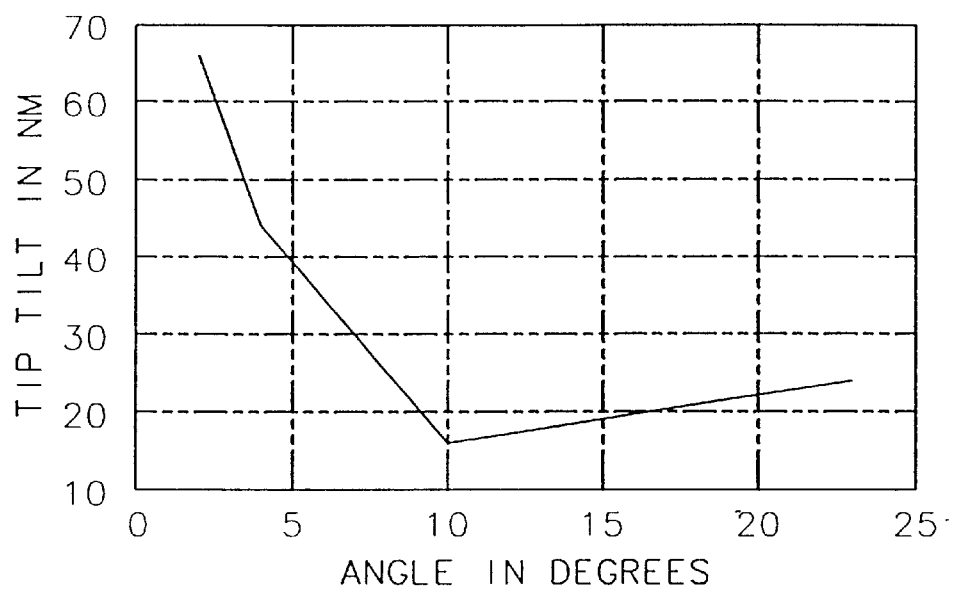
FIG. 5 is a graph showing tip tilt in nanometers on the y-axis and piezobeam tilt in degrees on the x-axis.

As illustrated in FIG. 3, the vertical deflection of the distal end portion 16 of the load beam 12 can be controlled by changing the angle of tilt of the piezoelectric beam 52 with respect to the hinge plane B. The values plotted in FIG. 4 are typical altitudes of the center point of the tip 82 (FIG. 2) of the distal end portion 16 corresponding to the maximum negative voltage within the range of actuator operation applied to the piezoelectric beam 52. These values represent the maximum deflection that the center of the tip may experience in one direction during operation for various values of piezoelectric tilt. The deflection is symmetric when the voltage is reversed in polarity. As shown in FIG. 3, the tip twist (i.e., the difference in altitude of the two corners 84 and 86 of the tip of the load beam 12) can also be controlled by changing the tilt angle of the piezoelectric beam 52 relative to the hinge plane B.

Thus, the piezoelectric micro actuator driven load beam mechanism 10, by means of tilting the piezoelectric beam 52 with respect to the hinge plane B, enables lift of the load beam 12 to be minimized and twist of the load beam 12 to be controlled and, consequently, improves the flight performance of the slider. The tilt can be zero or any value depending upon the piezoelectric properties and the loading conditions. When the tilt is zero, it makes an 'in-plane' design; that is, the piezoelectric beam 52 and the hinge portion 15 are coplanar. However, the piezoelectric beam has opposite face surfaces thereof attached to the load beam at its ends.

Figure 6:
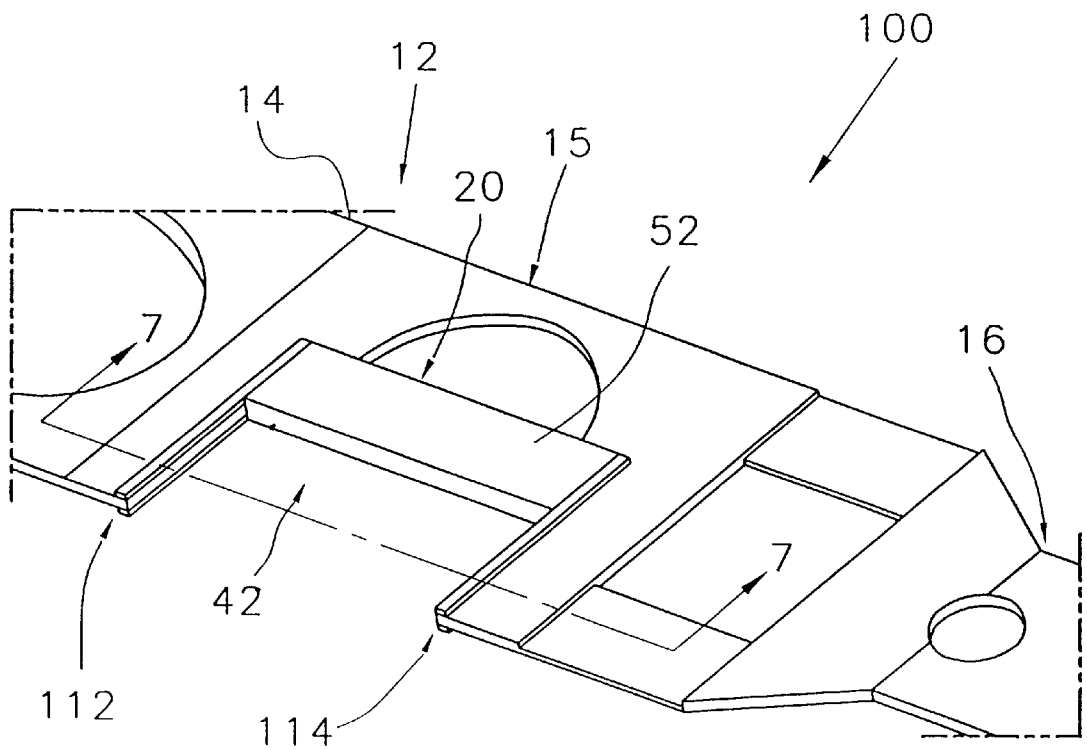
FIG. 6 is a perspective view of a section of another embodiment of a load beam suspension in accordance with the present invention.

FIG. 6 shows another load beam suspension in accordance with the present invention, the load beam suspension being generally indicated by reference numeral 100. The load beam suspension 100 is substantially identical to the load beam suspension 10, and thus the same reference numerals are used to designate like parts. However, the load beam suspension 100 differs from the load beam suspension 10 in the manner in which the ends of the piezoelectric beam 52 are retained in the pocket.

Figure 7:
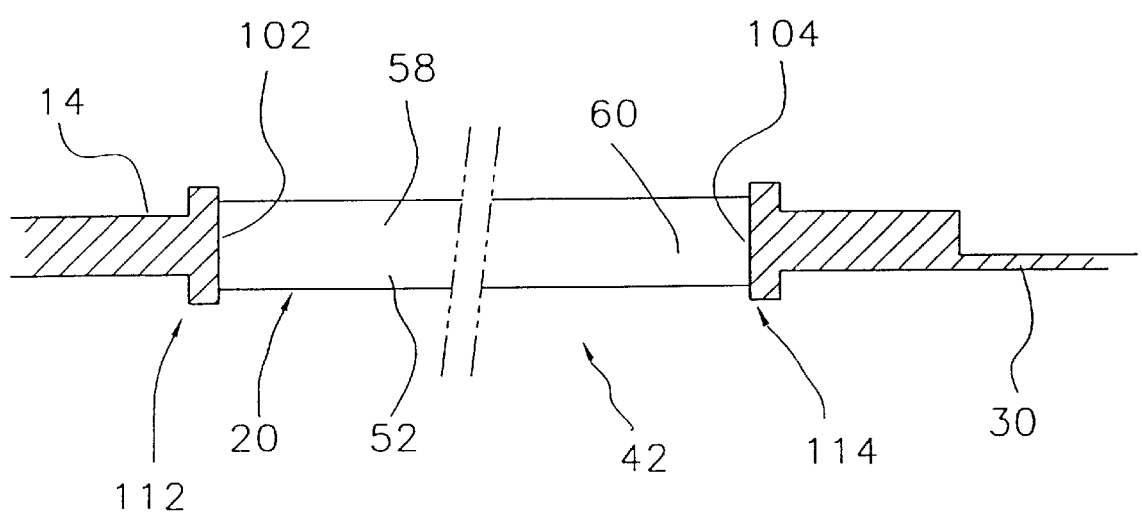
FIG. 7 is a cross-sectional view taken along the line 7—7 of FIG. 6.

As seen in FIG. 6, and more clearly in FIG. 7, the piezoelectric beam 52 is in line with the load beam 12, i.e., in the plane of the load beam. The axial end faces of the piezoelectric beam 52 are butted against and preferably bonded, as by gluing, to opposed faces 102 and 104 of catches 112 and 114. The catches are formed integrally with or otherwise attached to the proximal and distal portions 14 and 16 of the load beam 12, with faces 102 and 104 axially aligned in opposition to one another. The catches may extend above and below the top and bottom surfaces of the load beam, and the opposed faces 102 and 104 preferably extend transversely to the longitudinal center axis of the load beam 12.

Although the piezoelectric beam 52 could be glued or otherwise attached to the catches 112 and 114, preferably the piezoelectric beam 52 is operably retained in the pocket 42 without the need for glue. To this end, the piezoelectric beam 52 may have a length greater than the spacing between the opposed faces 102 and 104 when the hinge portion 15 is unflexed. Assembly of the piezoelectric beam 52 into the pocket 42 may be effected by inserting it between the opposed faces 102 and 104 with a press-fit or by applying an appropriate electrical pre-load to the piezoelectric beam 52 so that it shrink fits between the opposed faces 102 and 104. Thus, when not excited, the piezoelectric beam 52 will be maintained under a compressive load and the hinge will be flexed to an amount no less than one half the desired movement stroke of the hinge 15. The actuator structure and mounting preferably is symmetrical with respect to the hinge plane, thus minimizing out-of-plane forces acting on the load beam 12.

Suitably pre-loading the piezoelectric beam 52 against the catches 112 and 114 eliminates the need for adhesive bonding, which is a source of uncertain reliability, limited controllability and particle contamination. Therefore, the embodiment shown in FIGS. 6 and 7 further boosts reliability and performance-repeatability of the micro actuator driven load beam mechanism 100.

The foregoing features enable one or more advantages over other micro actuator driven load beam mechanisms to be realized. By minimizing the number of piezoelectric elements the cost and mass of the suspension may be reduced. Using a single piezoelectric beam reduces hysteresis effect. By virtue of its lower mass and advantageous CG position, it has better shock resistance. By virtue of its lower number of components, its assembly and electrical interface are less complicated and more reliable. A lower number of components reduces the possibilities of performance deviation arising from multiple combinations of piezoelectric beam characteristics (static, dynamic, temperature and aging) and variation in adhesive bonding. The pocket design assists controlling the alignment of the piezoelectric beams, which improves their batch performance. As there is no need to choose pairs of identical piezoelectric beams and glue them in an identical manner, the present invention improves the yield rate of piezoelectric driven load beam mechanisms.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A micro actuator driven load beam mechanism, for use in a head suspension assembly, comprising:
    a load beam including a proximal end portion, a distal end portion and a hinge portion connecting the proximal and distal end portions of the load beam for permitting relative movement therebetween in a hinge plane; and
    a piezoelectric beam connected between the proximal and distal end portions, the piezoelectric beam being selectively energizable to effect relative movement between the proximal and distal end portions;
    wherein the load beam includes a pocket for retaining at least one end of the piezoelectric beam, the piezoelectric beam being retained by the pocket in a plane inclined relative to the hinge plane.

2. A micro actuator driven load beam mechanism as set forth in claim 1, wherein the pocket is formed by longitudinally opposed catches having oppositely facing attachment surfaces to which opposite face surfaces of the piezoelectric beam are attached, respectively.

3. A micro actuator driven load beam mechanism as set forth in claim 1, wherein the pocket is formed by longitudinally opposed catches extending in opposite directions from the hinge plane which hold the piezoelectric beam in the plane inclined relative to the hinge plane.

4. A micro actuator driven load beam mechanism as set forth in claim 3, wherein the piezoelectric beam is shrunk fitted between the catches.

5. A micro actuator driven load beam mechanism as set forth in claim 3, wherein the catches have slots for retaining respective ends of the piezoelectric beam.

6. A micro actuator driven load beam mechanism as set forth in claim 1, wherein there is only one piezoelectric beam.

7. A micro actuator driven load beam mechanism for use in a head suspension assembly, comprising:
    a load beam including a proximal end portion, a distal end portion and a hinge portion connecting the proximal and distal end portions of the load beam for permitting relative movement therebetween in a hinge plane; and
    a piezoelectric beam connecting the proximal and distal end portions, the piezoelectric beam being selectively energizable to effect relative movement between the proximal and distal end portions;
    wherein the piezoelectric beam is disposed in a plane that is inclined relative to the hinge plane.

8. A micro actuator driven load beam mechanism as set forth in claim 7, wherein the proximal and distal end portions have oppositely facing attachment surfaces to which opposite face surfaces of the piezoelectric beam are attached.

9. A micro actuator driven load beam mechanism as set forth in claim 8, wherein the attachment surfaces are offset in opposite directions from the hinge plane.

10. A micro actuator driven load beam mechanism as set forth in claim 9, wherein the face surfaces of the piezoelectric beam are glued to the attachment surfaces.

11. A micro actuator driven load beam mechanism as set forth in claim 8, wherein the face surfaces of the piezoelectric beam are glued to the attachment surfaces.

12. A micro actuator driven load beam mechanism as set forth in claim 7, wherein the hinge portion includes a pair of edge portions and a relatively narrower portion therebetween, the edge portions being connected to the respective proximal and distal end portions.

13. A micro actuator driven load beam mechanism as set forth in claim 7, wherein there is only a single piezoelectric beam.

14. A micro actuator driven load beam mechanism as set forth in claim 3, wherein the piezoelectric beam is held between the catches with a press fit.

* * * * *